100 X

1000 X

100 X

1000 X

100 X

1000 X

INVENTORS
JOHN M. BLOCHER JR.
JOHN H. PEARSON
BY
*Gray, Mase + Dunson*
ATTORNEYS

100 X

100 X

100 X

100 X

100 X

100 X

100 X

*INVENTORS*
JOHN M. BLOCHER JR.
BY JOHN H. PEARSON

*Gray, Mass + Brunson*
ATTORNEYS

INVENTOR.
JOHN M. BLOCHER JR.
JOHN H. PEARSON
BY
*Gray, Mase + Dunson*
ATTORNEYS

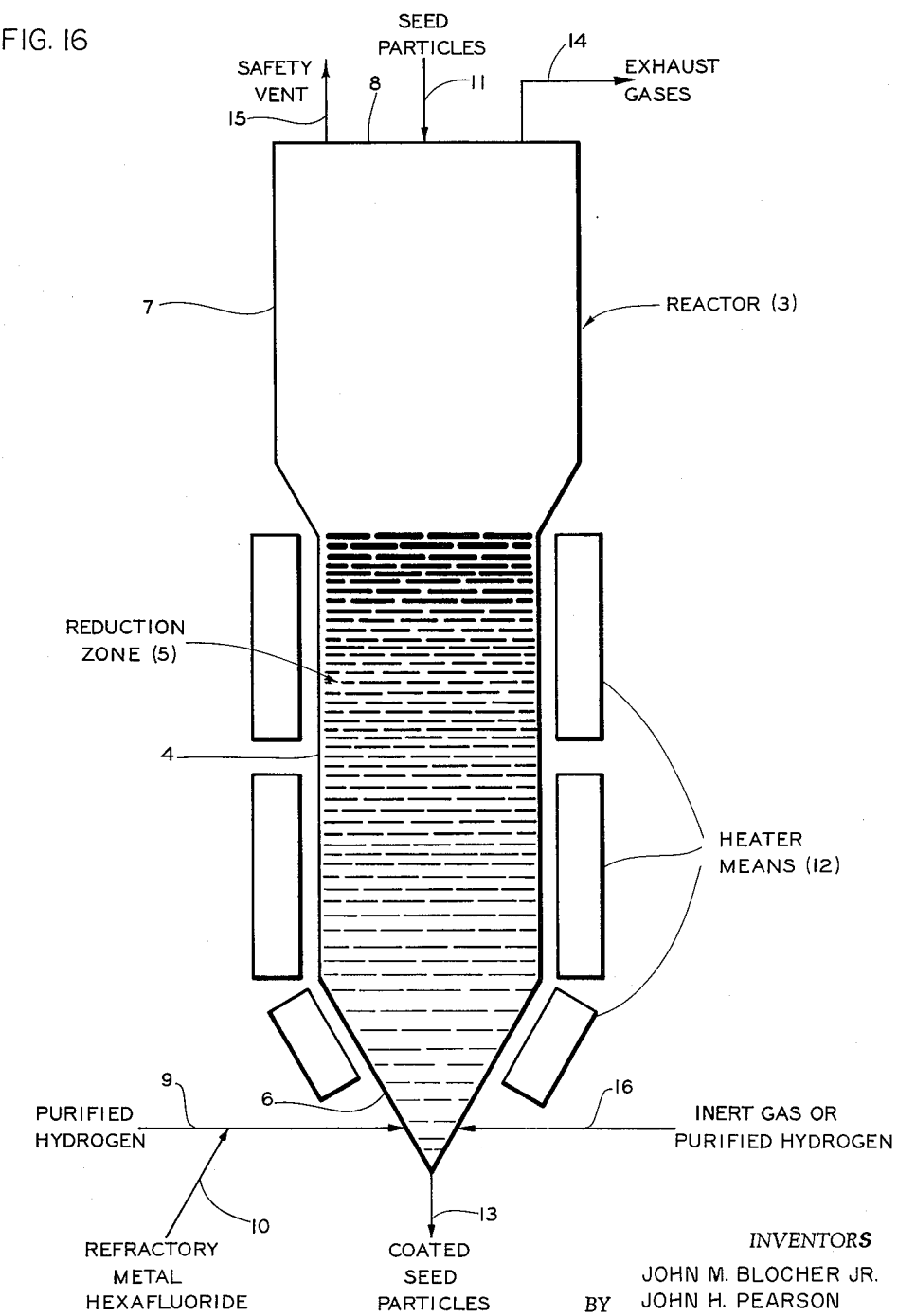

3,234,007
REDUCTION OF TUNGSTEN HEXAFLUORIDE TO
FORM IMPROVED TUNGSTEN PARTICLES
John M. Blocher, Jr., Columbus, Ohio, and John H. Pearson, Glen Rock, N.J., assignors, by direct and mesne assignments, to Allied Chemical Corporation, New York, N.Y., a corporation of New York
Filed July 5, 1963, Ser. No. 298,515
11 Claims. (Cl. 75—.5)

This invention relates to tungsten of outstanding and unexpected properties and to its preparation.

An object of the invention is a particulate tungsten of outstanding strength and ductility having markedly superior resistance to degradation of structural properties at high temperatures.

Another object is particulate tungsten capable of consolidation simply and economically by a single procedure into directly usable bodies and shapes exhibiting markedly superior qualities under extreme temperature service as well as of undergoing high temperature metallurgical processing into bodies and shapes exhibiting outstanding and unexpected ability to perform under extreme temperature service.

Another object is novel process for manufacture of the unique tungsten.

These and other objects will be apparent to those skilled in the art from the description which follows.

In the process of the invention, tungsten hexafluoride in its vapor phase is reduced in the presence of an excess of hydrogen in a fluidized bed of refractory metal seed particles, preferably tungsten, which may be 5 microns or larger and preferably at least 50 or 100 microns in size as up to 200 microns or larger, at a temperature sufficiently high to effect reduction of the tungsten hexafluoride to metallic tungsten. The seed particles are maintained at a temperature of at least 400° F. in a fluidized state. The produced tungsten metal deposits uniformly upon the metal seed, producing, as the reaction progresses, particulate product having the seed as a core and a growing matrix of newly formed tungsten.

By use of suitably purified tungsten hexafluoride and hydrogen, the deposited tungsten metal may be of controlled high purity, purities of 99.8 percent by weight and higher, and even 99.95 percent and higher being readily attained.

Flow of hydrogen and tungsten hexafluoride through the bed at velocities which maintain the growing particles fluidized therein is continued and the growing particles are maintained in the bed until the resulting roughly spherical or spheroidal particles have reached desired size, for example 10 to 10,000 microns. Convenient final particle sizes for handling for recovery purposes and for consolidation are in the range of 200 to 600 microns. The final particle diameter may be from two or three times the average diameter of the seed, preferably at least four times, as up to one hundred or several hundred times the seed diameter. The upper limit of size of particulate product is only that at which it becomes impossible or inconvenient to maintain fluidizing conditions with concomitant continuing growth of the particles. These particles are then recovered and constitute the novel product of the invention.

Product particles characteristically have metallic luster and consist essentially of a core of refractory metal seed particle having deposited thereon an extremely fine-grain microstructure of new tungsten metal. This microstructure is typically columnar grains of tungsten. Microscopic examination at 600 to 800 magnifications of etched particles under ordinary light indicates width and thickness of from a fraction of one micron up to about 2 microns and an apparent length of grain of at least 6 or more times width and usually at least 8 times width, the grain lengths radially oriented outwardly from the core or seed. Typical grains have width and thickness in the range of about $\frac{1}{10}$ up to 1-2 microns and an apparent length of 6 to 10 times width. However, grain size count using line intercept technique on electron photomicrographs at six thousand magnification indicates statistical average length to width ratio of greater than unity, as is characteristic of columnar grain structure, typically 2 to 4 times unity, with individual grains having length to width ratios of up to 10 or more times. When the core material is the unique product of the invention, as is preferred for realization of optimum properties, the characteristic fine-grained microstructure extends through the entire tungsten particle.

The novel particulate product may be consolidated directly into predetermined shape without working, and the consolidated shape may be metallurgically worked to produce, in either event, products having outstandingly superior properties. Significant metallurgical and mechanical property advantages displayed by the new tungsten metal in its particulate form are retained in consolidated and metallurgically worked forms produced therefrom. For example, the fine-grain microstructure of the particles is retained substantially unimpaired throughout consolidation and working. In addition, the new tungsten particles in their discrete, consolidated and wrought forms exhibit exceptional resistance to crystal growth or grain growth (hereinafter referred to as recrystallization), under conditions which actively promote these processes in tungsten. Thus, typically the product of the invention in particulate, consolidated and wrought forms undergoes less than 20 percent recrystallization despite a time-temperature history of about 2,900° F. for of the order of 3 to 4 hours. In many instances the amount of recrystallization at these conditions is of the order of 15 percent or less. In addition, the novel tungsten particles have exceptionally high hardness, above 900 KHN (Knoop Hardness Number) and usually at least 1,000 KHN and have densities of at least 95 percent, usually 97 percent or more of the theoretical density of tungsten (19.3 grams/cubic centimeter).

By means of gas-pressure bonding, the particles are formable directly into shapes of desired size and configuration, cored or otherwise, for example, bars or billets which may be readily worked as by rolling, swaging or forging into sheets, bars, billets, and the like, or extruded into wire, or which are capable of machining directly to a finished shape (often requiring only finish machining for this purpose). The gas-pressure-bonded shape has the novel, outstanding property of being machinable at temperatures substantially below ductile-brittle transition temperatures. Typically, the pressure-bonded material may be machined accurately and with good finish at ambient temperature (without preheating of the stock). This property of machinability at below ductile-brittle transition temperatures is retained during working of the pressure-bonded body. The final fabricated products, whether wrought or not, are of high tensile strength and possess unexpected and outstanding ductility, retention of tensile strength, hardness and ductility upon exposure to high temperature service conditions and a remarkable resistance to crystal growth or recrystallization under high temperature service conditions. Moreover, products made from particles of the invention retain ductility to surprising extent after time-temperature histories which would be expected to substantially destroy usable ductility. For example, wrought sheet of the particles of the invention retain ductile-brittle transition temperature (8T) of about 550° F. or less after 95 percent or more conversion by temperature treatment of original fine-grained microstructure into large-grained equiaxed crystal. Such material is capable of withstanding thermal shock despite its essentially complete recrystallization and so are unwrought substantially completely recrystallized gas-pressure bonded shapes.

The combination of valuable properties exhibited by the novel tungsten particles of the invention is not explainable through rationalization in the light of chemical or physiochemical measurements or by metallurgical theory.

FIG. 16 is a diagrammatic illustration of an apparatus for practicing an embodiment of the process. For simplicity and clarity in illustrating the process, the diagram omits many auxiliary items, such as reactant storage tanks and purification systems, valves, flow meters, pressure gages, safety traps, temperature controls, thermocouples and the like, although the use and application of such items will be obvious and readily apparent to one skilled in the art.

Figure 1:
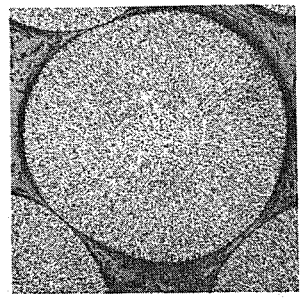
FIGS. 1 and 2 are photomicrographs illustrating the metallurgical microstructure of as-produced tungsten metal.
Figure 2:
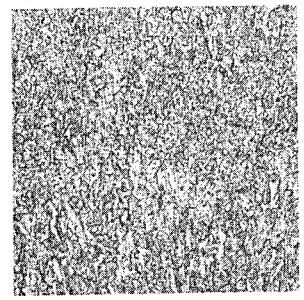

With reference to the drawings:

The fine-grain microstructure of the new tungsten metal can be noted from FIGS. 1 and 2, which are photomicrographs at magnifications of 100 times and 1,000 times, respectively, of representaitve as-produced tungsten particles of the invention made by hydrogen reduction of tungsten hexafluoride in a fluidized bed of commercial tungsten seed. In FIG. 1 the photomicrograph includes a cross-sectional view of one as-produced particle and of portions of neighboring granules mounted in a hardened plastic base. As will be apparent from FIG. 1, the core of commercial tungsten is of much coarser grain structure than the surrounding deposited tungsten. When the seed is obtained from product of the invention, as by fracturing, the grain structure is uniform throughout the entire particle. The new tungsten metal shown in FIGS. 1 and 2 is of a density of about 98.3 percent of the theoretical density of tungsten and has a hardness of 1,029 KHN; the individual radially oriented tungsten crystals average about one micron in thickness and width and about eight microns in length.

The spherical to spheroidal tungsten particles of the invention are convertible directly into dimensionally stable, strong, ductile, predetermined shapes having the properties referred to above. One method of producing such bodies involves placing the tungsten particles in a gas-tight thin-walled container of predetermined shape and dimensions, packing the same by vibration, to desired extent, for example to a bulk density of 65 percent or more of the theoretical density of tungsten, evacuating the container, and then subjecting the evacuated gas-tight container to gas pressure, time and temperature adequate to deform the container material and cause it to flow inwardly and compress the contained tungsten particles until they become consolidated into a unitary mass. The gas is one which, considering the conditions and container metal employed, will not penetrate the latter.

Typically, Armco iron, Zircaloy and molybdenum containers may be used with helium or argon as compressing gas under 5,000 to 20,000 pounds per square inch while maintaining the container and contents at annealing temperatures for tungsten consistent, of course, with the maintenance of the integrity of the encasing envelope as a gas-tight unit. Suitable temperatures, considering the limitations of the encasing envelope and pressure, may be in the range of about 2,000° F. to about 3,500° F. The time necessary may vary from several minutes to several hours, depending upon the temperature used and the density of shaped product desired.

The bonding process involves deformation or flow of the individual particles to decrease interstitial volume and increase area of contact between the discrete particles, accompanied and followed by development of metallurgical bond between the particles by intercrystallization between the contiguous interfaces. At temperatures of about 2,500° F. and higher, as within the range of 2,500° F. to 3,000° F., the deformation processes proceed easily to a substantially impervious product (92 percent or higher of the theoretical density of tungsten) at times of the order of 4 hours or less, in many instances, of the order of two hours.

The tungsten particles of the invention are remarkably resistant to crystal growth upon being subjected to temperatures for times in excess of times required to anneal compacted and sintered commercial tungsten powder. However, in producing shaped articles from the product of the invention by particle consolidation only, maximum tensile strength is obtained if excessive times, i.e., times beyond those required to produce the interparticulate crystallization, are not employed. The worker skilled in the art can, with a minimum of experimentation, determine the optimum composition of encapsulating metal, time, temperature and pressure to suit the purposes of the projected use of shaped bodies of the invention.

Figure 3:
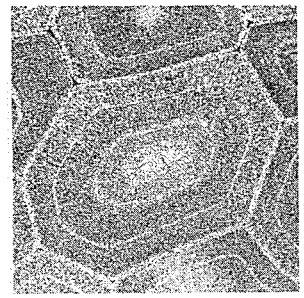
FIGS. 3 and 4 are photomicrographs illustrating the metallurgical microstructure of particulate as-produced tungsten metal after gas-pressure bonding.
Figure 4:
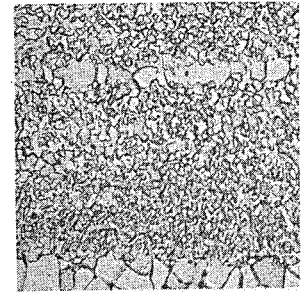

FIGS. 3 and 4 illustrate, at magnifications of 100× and 1,000× respectively, a section of a typical consolidated shape produced by gas-pressure bonding from tungsten particle product of the invention. The shape was made by the above-described technique using 10,000 pounds per square inch of helium pressure on a molybdenum capsule containing essentially spherical tungsten particles of about 300–600 micron size for about three hours while maintaining the unit at about 2,900° F. The particles were prepared by passing a mixture of tungsten hexafluoride and hydrogen (the latter in amount about 20 times the stoichiometric amount required to reduce the hexafluoride to tungsten) at fluidizing velocity in batch operation through a bed of seed particles, of commercial tungsten powder of about 99.85 percent purity produced by General Electric Company having an average particle size of about 100 microns, maintained at about 1,100° F. for a total time of about 24 hours. Periodically, the flow of gases was interrupted and the bed cooled and allowed to remain quiescent.

FIG. 3 shows the individual particles, distorted by the bonding process, containing the seed, which has obviously undergone extensive crystal growth, surrounded by deposited tungsten retaining essentially the original fine crystallinity. This fine-grained material occurs in concentric layers because of the discontinuity of the deposition step referred to. Particles produced by continuous operation until desired particle size is attained are continuous homogeneous bodies, as illustrated by each of the successive layers. The bonded particles are generally polyhedral in shape and, at their areas of mutual contact, are interconnected by interparticulate crystals of tungsten which, in the specimen shown in FIGS. 3 and 4 (selected for clear demonstration of the interrelationship of the individual particles) are of somewhat larger size than the deposited crystal. Use of a different container metal, for example Zircaloy with molybdenum present, results in interparticulate crystallinity which is finer grained and barely discernible at the magnifications shown.

The particulate tungsten of the invention is unique in that the final dimensions of pressure-bonded shapes made directly from the particles are so accurately predictable, the density through the pressure-bonded shape so uniform, and the strength of the units such that the entire pressure-bonding operation may be confidently conducted for the purpose of yielding a pressure-bonded unit which, without working or other processing (except possibly chemical removal of the encapsulating metal) needs only finish machining to produce a satisfactory final product. Nozzle and cone shapes are typical of those which can be produced in this way, with finish machining only to remove a few thousandths of an inch of metal from the gas-pressure-bonded shape.

The pressure-bonded shapes with or without prior removal of the encapsulating metal, as by leveling with acid, may be worked by conventional metallurgical techniques such as rolling, forging, drawing, swaging, spinning and the like under conditions suitable for making wrought tungsten. In rolling or forging, for example, several passes may be employed at conditions to give controlled reduction, which may be uniform, say 20 percent to 30 percent per pass, or to decreasing or increasing extent. Encapsulating metal may be removed after completion of the working or after any desired pass.

Working of consolidated bodies of particles of the invention may be carried out at relatively low temperatures—significantly lower than ordinarily employed with, or sometimes even suitable for, fabrication of commercially available tungsten—sintered powdered tungsten of equivalent purity. For instance, in rolling, the breakdown pass may be at temperatures substantially below 3,000° F. and, in fact, for optimum development of the wrought properties of the metal, is preferably not in excess of 2,900° F., very satisfactory to optimum results being often obtained at breakdown or maximum working temperatures in the range of 2,600° F. to 2,800° F. Successive fabrication passes may conveniently be at lower intervals of the order of 100° F. to 300° F., say 200° F. The commercially available consolidated tungsten—sintered compactions of powdered tungsten—often require, for optimum development of metallurgical properties working temperatures several hundred degrees higher, up to 400° F. or more higher, than those indicated. The resulting wrought products are, moreover, structurally inferior to those made possible by the invention. Thus, the product of the invention provides for substantial economies of wrought material in manufacture of items meeting structural specifications, as well as for superior products.

Figure 5:
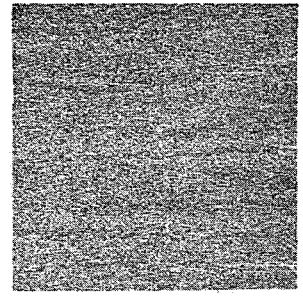
FIGS. 5 and 6 are photomicrographs illustrating the metallurgical microstructure of wrought tungsten particles of the invention.
Figure 6:
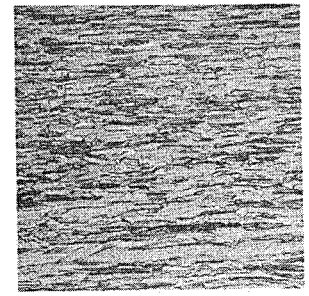
Figure 7:
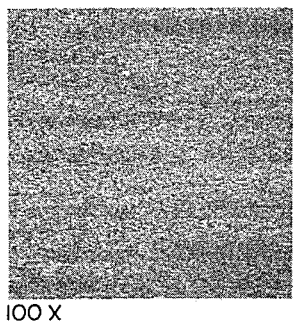
FIGS. 7 through 10 are photomicrographs illustrating the metallurgical microstructure of wrought novel product after being subjected to severe time-temperature conditions.
Figure 8:
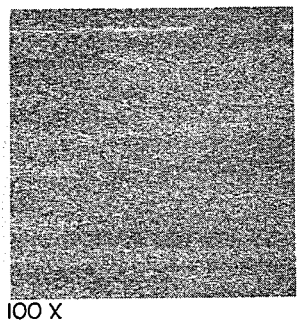
Figure 9:
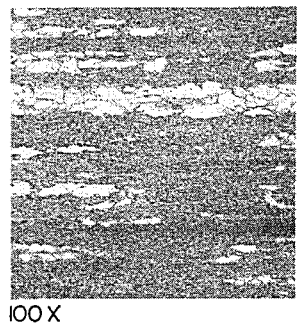
Figure 10:
Figure 11:
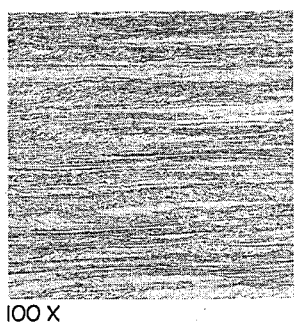
FIGS. 11 through 13 are photomicrographs illustrating, for comparison purposes, a commercially available wrought tungsten metal, in an as-wrought condition (FIG. 11), and after being subjected to severe time-temperature conditions (FIGS. 12 and 13)

Characteristic fine-grained structure typical of wrought product of the invention is illustrated in FIGS. 5 and 6, which are photomicrographs at magnifications of 100× and 1,000× respectively of a specimen of a wrought gas-pressure-bonded consolidated unit of tungsten particles of 400–500 micron size produced under conditions similar to those described above, the encapsulating metal having been removed by nitric acid leaching. The bonded unit was then reduced by rolling to only 80 percent reduction of original thickness by three rolling passes at about 2,640° F., 2,460° F. and 2,280° F. respectively. The rolled product had a Vickers hardness number of 567. The fineness of crystalline structure of the wrought product is evident by comparison of FIG. 5 with the as-wrought sintered powder product illustrated in FIG. 11, which is a photomicrograph at magnification of 100× of such a product made by rolling to about 95 percent reduction and having a Vickers hardness number of 505. Rolling of the product of the invention to 95 percent reduction results in an even further development of desired properties of the novel tungsten, for example, ductility and hardness.

Figure 12:
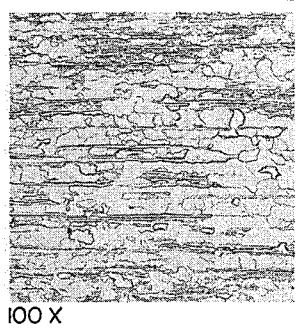
Figure 13:
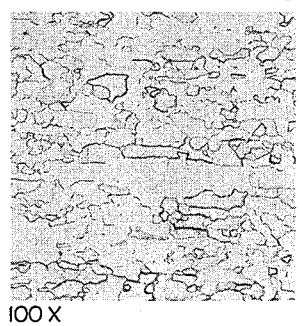

Superiority of the tungsten particles of the invention is further illustrated by FIGS. 7 through 10 and 12 through 15. FIGS. 7 through 10 are photomicrographs at magnifications of 100× of wrought sheet (rolled to 80 percent reduction), pressure bonded novel spheroidal particles of tungsten heated for one hour at about 1,850° F., 2,190° F., 2,550° F. and 2,910° F. respectively and which had Vickers hardnesses of 554, 536, 536 and 500 respectively. FIGS. 12 and 13 are photomicrographs (100×) of sintered compact of commercial tungsten powder of equivalent purity rolled to about 95 percent reduction and heated for one hour at 2,550° F. and 2,910° F. respectively. These rolled products had Vickers hardnesses of 399 and 380 respectively. It is obvious from comparison of FIGS. 7 through 10 with FIGS. 11 through 13 that the wrought form of the tungsten particles of the invention retains a significantly greater proportion of fine-grained structure than the commercial wrought tungsten under extreme temperature exposure.

Figure 14:
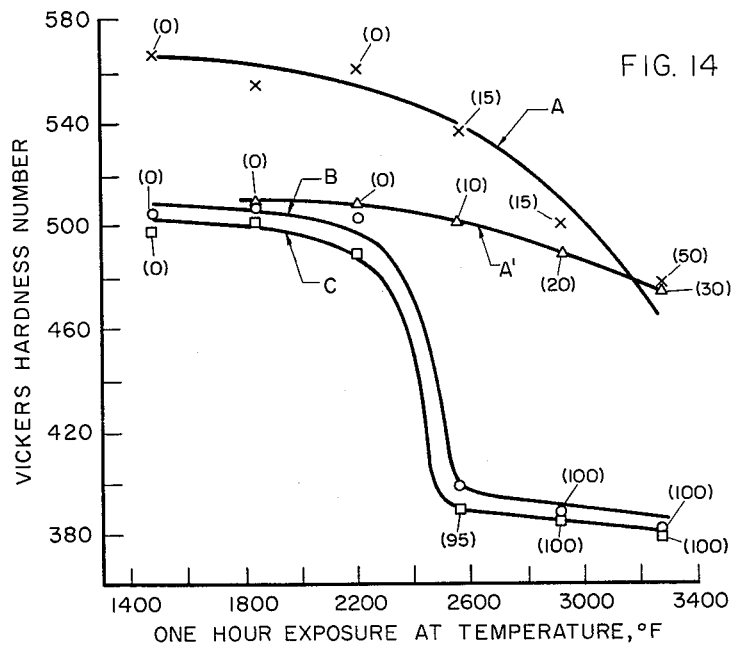
FIG. 14 illustrates graphically comparative hardness of wrought forms of product of the invention and of two commercially available tungstens.
Figure 15:
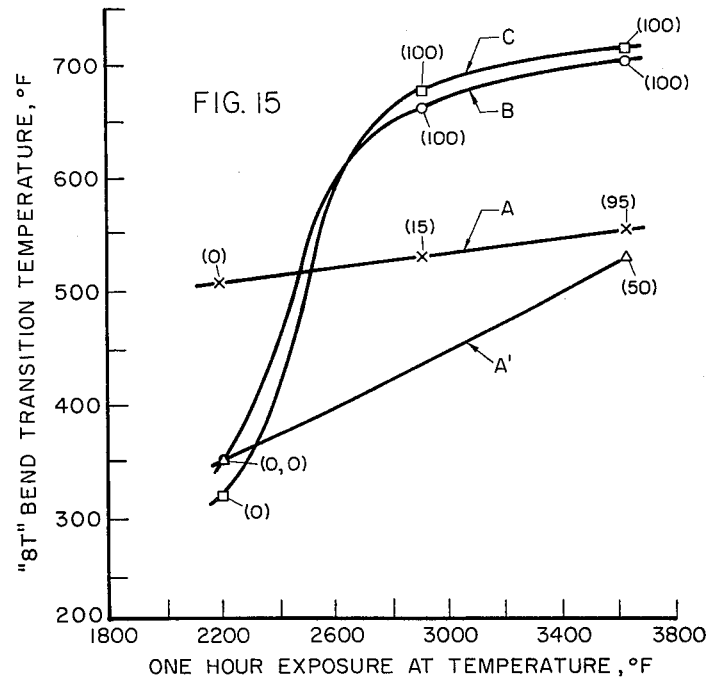
FIG. 15 illustrates graphically the comparison of "8T" Bend Transition Temperatures of wrought product of the invention and of two commercially available tungstens after being subjected to various severe time-temperature conditions.

FIGS. 14 and 15 illustrate (Curves A and A') comparison of rolled (Curves A=80% reduction; Curves A'=92% reduction) pressure-bonded units of the spheroidal particles of the invention as compared with rolled (92 percent reduction) sheet produced from sintered tungsten powder of equivalent purity produced by General Electric Company (Curves B) and Fansteel Metallurgical Corporation (Curves C).

FIG. 14 illustrates the remarkable ability of wrought invention product to retain strength after heating at the conditions indicated as demonstrated by Vickers hardness number of the heated product after cooling. FIG. 15 demonstrates the unusual characteristic of the wrought invention product to retain low temperature ductility after similar time-temperature histories.

It will be noted (FIG. 14) that the fabricated products made from the novel tungsten particles not only have superior strength and hardness prior to annealing but retain marked superiority in this regard over the fabricated commercial products during service at high temperature. In fact, after service at temperatures as high as or higher than 2,500° F. the fabricated products of the invention retain hardness in excess of 450 (Vickers hardness number) and, in many instances at least 500 or even essentially their initial hardness, and hence, in large measure, their strength, after the fabricated items made from commercial product have become so seriously depreciated in these properties as to affect materially their structural value for many high-temperature services, for example, in rocket components, such as nose cones and nozzles. Fabricated products of the invention, to the contrary, have properties required for these purposes.

The retention of strength and hardness after high-temperature service, as well as the superior strength throughout an extended high-temperature range, permit substantial economies of metal and consequently of weight for structures intended for high-temperature service. In fact, during and after exposure of 2,910° F. for a prolonged period, wrought product of the invention retains nearly half the strength of product which has not been subjected to high temperatures. The wrought material from commercial tungsten of comparable purity retains so little strength during and after exposure to 2,910° F. as to be of little, if any, value for service at such a temperature level. Again, by way of contrast, fabricated items made from product of the invention may be used at temperatures as high as 3,200° F. and higher.

FIG. 15 depicts the changes in the minimum temperatures at which a rolled sheet, which has been subjected to the time-temperature conditions indicated may be bent without cracking over an 180° arc having a radius of eight times sheet thickness. It is evident from this figure that the fabricated product of the invention retains values in this respect below 550° F. and, as shown by Curves A and A' usually below about 550° F. despite time-temperature history which results in from substantial to essentially complete recrystallization. It is noteworthy that the rolled product remained over about 80 percent uncrystallized after being exposed to about 2,900° F. By contrast, rolled product made from commercial tungsten has depreciated quite substantially at about 400° F. lower exposure temperature and had become substantially entirely recrystallized. This ability to bend without breaking at low temperatures after severe high-temperature history is a measure of the ability of the product in high-temperature service to withstand thermal shock and other stresses encountered during service at high temperatures. Normally the brittle-ductile transition temperature of tungsten products indicates approximately the minimum temperature at which machining of the product may be undertaken with reasonable assurance that it is not too brittle for the machining operation. Surprisingly, shapes made from particles of the invention are machinable at substantially lower temperatures—even at room temperature with conventional machining conditions.

The number values adjacent the curves of FIGS. 14 and 15 indicate the percentage of crystals determined by microscopic examination to have been converted by the time-temperature experience indicated to equiaxed large grained form. The remarkable resistance to crystal growth of the invention product is illustrated by these diagrams. Also illustrated is the amazing ability of the novel product to retain ductility when substantially completely recrystallized.

FIGS. 12 and 13 show that the wrought product of the commercial powder after high-temperature service retains little or none of the original crystal structure. FIG. 13 shows that this type product has become essentially completely recrystallized after service at 2,910° F. By contrast, FIGS. 7, 8, 9, and 10 demonstrate that wrought product of the particles of the invention resists recrystallization during high-temperature service to outstanding degree, retaining to surprising extent after such service original crystal structure and, hence, tensile strength, ductility, workability and utility for service of this type.

A unique property of tungsten particles of the invention lies in the fact that by a single step, gas-pressure bonding as described above, the particles may be converted to a solid unit of predetermined size and shape having density desired which may approach the theoretical density of tungsten. If the optimum in strength is desired, density should be 92 percent or higher of theoretical. The specimen of bonded particles shown in FIG. 3 had density of above 99 percent of theoretical.

These consolidated-only products have structural and other properties of wrought tungsten made therefrom and, like wrought tungsten produced therefrom, may be cold machined directly into a desired finished shaped having satisfactory service characteristics, for example, those required in rocket nozzle throat inserts. Commercial sintered tungsten powder shapes, even though carefully prepared under conditions yielding a sinter of maximum density, do not possess such properties. Moreover, the high density bonded particles of the invention are so uniform in structure and have dimensional predictability of such a high order that in many instances the bonded shape as produced requires only finish machining. It may be confidently expected that the finished gas-pressure bonded article will have final dimensions in each direction approximately 10 percent smaller than the container within which the pressure bonding is effected. As typical of the uniformity of the shape of the pressure bonded article reference may be made to test bars for tensile strength determinations measuring nominally ¼" x ⅞" x 3". Such bars typically have widths and thicknesses throughout their length varying only by ±0.005" from their nominal dimensions. Also cylindrical rods of nominal diameter of 0.670" and length of ten inches will vary only by ±0.010 inch from the nominal diameter throughout their lengths. By contrast, the shape and dimensions of articles produced by gas-pressure bonding of as-packed commercial tungsten powder are not predictable within useful limits.

A rocket nozzle insert was produced by finish machining only of a suitably sized cored pressure bonded-only tungsten particle product of the invention having particle size averaging about 450 microns built on about 100 micron seed obtained by grinding product of the invention. This shape was subjected to standardized test firing conditions using an aluminum based propellant (exhaust temperature 6,500° F., average pressure of 1,220 pounds, for 48 seconds). Despite the fact that this specimen reached actual temperature of at least 4800° F. and hence had recrystallized completely, average grain diameter at the exterior surface was only 115 microns and average grain diameter at nozzle throat surface was only 50 microns. Most of the crystal structure was of substantially smaller grain size than those specifically referred to and had undergone very little growth, indicating suitability of the nozzle shape for rocket service. Moreover, the throat erosion was very slight. Nozzle insert shapes produced by conventional working and fabrication techniques from commercially available sintered powder tungsten subjected to test firing typically show visually evident surface checks and cracking, and frequently actual disintegration.

The development of satisfactorily strong tungsten shapes by pressure bonding alone and retention of strength through working or fabrication processes is indicated by Table I which shows Knoop hardness of pressure bonded specimens as such (0 percent reduction) and after rolling to varying extent at several temperatures.

*Table I*

| Rolling temperatures (° F.) | Hardness, KHN, after cumulative reductions indicated | | | | |
|---|---|---|---|---|---|
| | 0% | 20% | 40% | 50% | 80% |
| 2,910 | 760 | 749 | 762 | 800 | 774 |
| 3,090 | 760 | 704 | 652 | 637 | 610 |
| 3,270 | 760 | 736 | 657 | 610 | 554 |

By contrast, sintered tungsten powder before working (rolling, forging or the like) is of extremely low hardness, and must be worked to develop this property.

Where optimum tensile strength of shaped products is desired, the consolidated particles of the invention should be worked as by rolling, forging, swaging or the like. Thus bodies of consolidated-only particles, which typically have ultimate tensile strengths of at least 50,000 pounds per square inch and usually at least 60,000 pounds per square inch or more, may be improved by working into a fabricated product exhibiting superior tensile strength at normal temperature and under high temperature service conditions as demonstrated by Table II. In this table there is shown the tensile strength measured at temperature indicated of shapes produced by consolidating particles of the invention, rolling the consolidated product (80 percent reduction), and stress-relief annealing of the rolled sheet under conditions yielding about optimum ductility, as compared with rolled (95 percent reduction) sintered compacted commercial tungsten powder of equivalent purity also annealed to optimum ductility.

Table II

| Material | Temperature, °F. | Yield strength, 10³ p.s.i. | Ultimate tensile strength, 10³ p.s.i. |
|---|---|---|---|
| New tungsten | *RT | | 238 |
| Commercial | RT | | 200 |
| New tungsten | 600 | 130 | 150 |
| Commercial | 600 | 96.8 | 107 |
| New tungsten | 1,000 | 118 | 137 |
| Commercial | 1,000 | 98.7 | 105 |
| New tungsten | 2,000 | 76.1 | 78.6 |
| Commercial | 2,000 | 61.0 | 72.5 |
| New tungsten | 3,000 | 15.6 | 17.6 |
| Commercial | 3,000 | 9.00 | 15.2 |

*Room temperature of about 75° F.

The ability of shaped or final products made from the novel particles of the invention to retain superior valuable properties after high temperature service is emphasized in Table III which shows tensile strengths measured at indicated temperatures of the rolled products referred to in Table II which have been further subjected to 2910° F. for one hour.

Table III

| Material | Service temperature, °F. | Yield strength, 10³ p.s.i. | Ultimate tensile strength, 10³ p.s.i. |
|---|---|---|---|
| New tungsten | 1,000 | 84.2 | 88.8 |
| Commercial | 1,000 | 16.8 | 55.6 |
| New tungsten | 2,000 | 55.0 | 58.0 |
| Commercial | 2,000 | 10.5 | 31.2 |
| New tungsten | 3,000 | 18.1 | 19.8 |
| Commercial | 3,000 | 9.00 | 14.0 |

It will be noted from Tables II and III that the products of particles of the invention are markedly superior throughout the entire range of temperatures and after being subjected to high temperature service.

FIG. 16 of the drawings illustrates one mode of effecting the process of the invention in which there is shown a reactor, generally designated 3, of a suitable material which does not react with the reactants. Suitable metals include high nickel content alloys of copper and nickel such as Monel metal. Copper is a useful material for inlet and exit lines. Tetrafluoroethylene polymers and chlorotrifluoroethylene polymers are useful for gaskets and for flexible lines. The reactor 3 comprises a vertical tubular-shaped section 4 providing a reduction zone 5, tapering into lower conical section 6 and flaring gradually outward into an upper section 7 which is closed by a top 8 which may be provided with a suitable safety vent 15. Lines 9 and 10 are provided to introduce the reactants, hydrogen and tungsten hexafluoride, into the system to flow as a mixture into lower conical section 6, and upwardly through reduction zone 5.

Line 11 is provided through top 8 to introduce refractory metal seed particles into reactor 3, wherein they drop into the reduction zone 5. Heater means 12, such as electrical resistance coils, or induction heaters, or a gas fired furnace, surrounding the reduction zone, heat the particles therein and maintain them at a suitable temperature for the hydrogen reduction of tungsten hexafluoride. Reaction temperature may be in the range of about 400° F. up to a temperature of 2000° F. or somewhat higher. In the interest of use of economical materials of construction of the reactor, it is preferred to maintain the bed of particles at not above 1825° F. No particular advantage accrues by use of temperatures substantially above this level. In fact, use of the process has demonstrated that quite satisfactory commercial operating temperatures lie in the range of about 1000° F. to 1200° F., as for example about 1100° F. to 1150° F. At temperatures below about 1200° F. or with low excesses of hydrogen, substantial quantities of unconverted tungsten hexafluoride tend to exit the reaction zone. Within the reduction zone 5, the upwardly flowing hydrogen tungsten hexafluoride, and, as it is produced, hydrogen fluoride, function to fluidize the seed particles. Under proposed operating conditions, the volume of hydrogen greatly exceeds the volume of tungsten hexafluoride and hence serves as the primary fluidizing component at the outset of the reaction, its effect being augmented by produced hydrogen fluoride. Within reduction zone 5, the tungsten hexafluoride is reduced to tungsten meal which deposits on the fluidized metal seed particles producing, by growth to predetermined extent, the unique tungsten particles of the invention. As the gases enter expanded upper section 7, the resulting decrease in their velocity is to below fluidizing level; hence, the lower end of section 7 defines the upper lever of the fluidized bed. Finally, the gases exit the reactor by upper discharge line 14. At this point they might contain finely divided solids which may be separated from them and returned to the reactor by known means.

The reactor may be operated on a batch basis or with continuous introduction of seed and continuous withdrawal of produced particles from the fluidized bed, for example, at a level adjacent the bottom, as through line 13. The continuously withdrawn particles are then preferably subjected, possibly after purging of accompanying gas therefrom, to desired classification procedure to separate out finished product of desired size. Smaller particles are then returned to the reactor, for example with the feed of fresh seed.

The system shown in FIG. 16 is primarily adapted for batch operation, in which feed of hydrogen and tungsten hexafluoride is initiated through a precharged bed of refractory metal seed and maintained for times, depending upon reaction temperatures and proportion of feed components selected, which will produce the desired size of product particle. At the end of that time, which can be selected quite readily with experience with the operation, the feeds are discontinued and the reactor is purged of combustible and corrosive substances by inert gas, typically argon or helium, admitted through line 16. The tungsten product may then be withdrawn through line 13 immediately or after a desired cooling period. In operation of the reactor the necessary endothermic reaction heat and specific heats may be supplied at least in part by preheating the tungsten hexafluoride, hydrogen or both in which event these reactants are not mixed prior to their admission into contact with the seed.

Gases exiting the reactor by line 41 contain hydrogen, HF, and, depending upon the temperature and proportions of feed components selected for the reaction, may also contain some tungsten hexafluoride. Under preferred conditons, however, there is virtually no metal fluoride present. For economical operation the exhaust gases are preferably processed by techniques which will be apparent to those skilled in the art to separate hydrogen in very dry air-free form for reuse and, if it is present, to recover tungsten fluoride.

In order to develop to the optimum extent the desirable properties of the unique product of the invention the hydrogen and tungsten hexafluoride feeds should be of such purity as to yield a product which, except for fluorine content, has a purity of at least about 99.8 percent tungsten by weight. Products of this purity and, in fact, of purity of 99.95 percent or more tungsten by weight may be readily obtained by using distilled tungsten hexafluoride sold commercially and hydrogen diffused through palladium. The product contains characteristically the impurities present in commercially available tungsten plus fluorine in up to about 100 parts per million, usually 50 parts per million or less. The unique crystalline and other properties of the product of the invention are unexplainable under any theory concerning the nature and extent of usual impurities present, but possibly might be attributable to the presence of the small quantity of fluorine, the form of which is not known, except occurrence as fluoride ion.

As indicated hereinabove, the quantity of hydrogen gas employed must be in excess of the stoichiometric equivalent of the tungsten hexafluoride feed. The extent of the excess required to effect complete reduction of the hexafluoride to metal tends to be a function of reaction temperatures. A guide for selection of satisfactory proportionate quantities of reactants may be the fraction represented by one-third the number of moles of hydrogen fed over the number of moles of tungsten hexafluoride feed. At temperatures of the order of 400° F. that fraction should be about 50 or higher, at 1,000° F. to 1,200° F. about 10 or higher and at 1,825° F. and higher may be 1.5 to 2 or higher.

Specific examples of the invention are summarized in Table IV.

particles grow in size and gradually become spheroidal in shape and ultimately approximate spherical shape. Upon continued operation under given conditions, for instance those of Example 1 for twenty-four to forty-eight hours total particulate product averaging 300 to 400 microns in size are obtained.

Also for high quality of tungsten product, tungsten of the type deposited by the process of the invention should constitute at least the predominant proportion of the final particulate product. When the seed is obtained by use of that process, the final particles are all or substantially all constituted by the normal deposited tungsten. When the seed is a different tungsten, deposition should be continued until deposited tungsten aggregates at least double the weight of the seed. Continuing the process under the conditions of Example 1 until ultimate particle size is 300 to 400 microns results in product in which the average particle contains a tungsten deposit of about 92 to about 97 percent by weight of product made during the run, while continuing until ultimate

*Table IV*

| Example No. | Seed particles | | | | Process conditions | | | Product | | |
|---|---|---|---|---|---|---|---|---|---|---|
| | Material | Av. dia. ($\mu$) | Mesh size [a] | Wt. (grams) [b] | Reduction zone temp. (° F.) | $H_2/WF_6$ ratio [c] | Duration (minutes) | Yield (percent) [d] | Production rate (lb./hr.-ft.$^2$) | Approximate F content, parts per million |
| 1 | W | | −80 to +200 | 1,000 | 1,110 | 20.0 | 240 | 99+ | 21.7 | 12 |
| 2 | W | 111 | | 1,417 | 930 | 24.0 | 35 | 34.0 | 8.6 | |
| 3 | W | 329 | | 1,500 | 1,020 | 24.1 | 30 | 87.9 | 31.7 | |
| 4 | W [f] | 217 | | 1,000 | 1,110 | 20.1 | 180 | 95.6 | 17.2 | |
| 5 | W | 142 | −80 to +200 | 1,000 | 1,120 | 25.9 | 95 | 100.0 | 17.7 | |
| 6 | W | 112 | −100 to +200 | 1,000 | 1,140 | 18.5 | 120 | 100.0 | 24.7 | |
| 7 | W | 115 | | 1,500 | 1,160 | 17.4 | 60 | 95.0 | 35.5 | 20 |
| 8 | W | 112 | | 2,762 | 1,180 | 10.4 | 30 | 96.4 | 60.8 | |
| 9 | W | 111 | | 2,730 | 1,184 | 6.8 | 20 | 92.4 | 95.2 | 20 |
| 10 | W | | −80 to +200 | 1,000 | 1,115 | 14.7 | 360 | 98.8 | 29.5 | |
| 11 | W | | −80 to +200 | 1,000 | 1,110 | 17.7 | 270 | 97.2 | 24.6 | |
| 12 | W | 112 | | 950 | 1,110 | 19.1 | 345 | 98.3 | 18.0 | 30 |
| 13 | W | 113 | −80 to +200 | 1,000 | 1,110 | 19.2 | 120 | 98.2 | 22.3 | |
| 14 | W | 151 | | 1,000 | 1,110 | 20.1 | 150 | 97.3 | 16.3 | |
| 15 | W | | −80 to +200 | 1,000 | 1,110 | 20.2 | 40 | 92.8 | 26.9 | |
| 16 | W | 126 | −80 to +200 | 1,000 | 1,120 | 20.3 | 120 | 100.0 | 22.5 | |
| 17 | W | | −60 to +200 | 1,000 | 1,110 | 25.1 | 420 | 93.8 | 24.4 | |
| 18 | Ta [e] | 151 | | 1,800 | 1,160 | 4.4 | 13 | 4.1 | 74.0 | |
| 19 | Ta [e] | 153 | | 1,500 | 1,170 | 39.2 | 90 | 12.0 | 11.5 | |
| 20 | Ta [e] | 156 | | 1,500 | 1,150 | 48.0 | 240 | 50.1 | 10.6 | |

[a] U.S. Sieve Series.
[b] Total weight of seed particles charged.
[c] Defined as one-third the molar ratio of hydrogen to hexafluoride.
[d] Percent by weight of W content of $WF_6$ charged.
[e] Some loss of tantalum seed particles is experienced; higher excess hydrogen ratios decrease this loss of tantalum seed. Seed particles of Mo and also of a W-Nb alloy have been successfully employed.

[f] The seed of Example 4 was a portion of the product of Example 17, whose seed was a portion of the product of Example 10, whose seed was a portion of the product of Example 9, whose seed was a portion of the product of Example 8, in which the seed was a commercially available high-purity tungsten. The product of Example 4 thus contained the commercial tungsten seed employed in Example 8 and new tungsten metal deposited in Examples 8, 9, 10, 17, and 4 in an amount constituting in excess of 93 percent by weight of the product of Example 4.

The examples numbered as indicated were effected during batch operation of a two-inch internal diameter Monel metal vertical reactor which was externally heated by electrical resistance units. The runs were initiated by charging into the reactor refractory metal seed particles of the material, size and quantity (weight) indicated, purging the reactor with argon, fluidizing the reactor contents with palladium diffused hydrogen, heating the seed to the temperature indicated, thereupon admitting commercial distilled tungsten hexafluoride to the bottom of the reactor, adjusting the feed of hydrogen to about 1½ cubic feet per minute standard conditions and the feed of tungsten hexafluoride to maintain the $H_2/WF_6$ ratio indicated, and maintaining the conditions described for the time shown. At the end of that time the heating and flow of metal fluoride were discontinued and hydrogen flow continued until bed temperature declined below about 100° F. The products were generally spheroidal in shape and contained the quantity of tungsten in the original hexafluoride feed to the extent tabulated, the deposition having been made at the rate per square foot of reactor area shown.

Upon beginning operation, the particles of seed plus initially deposited tungsten conform roughly in shape to that of the seed granules. As operation continues, the particle size is about 600 microns results in product in which the average particle contains a tungsten deposit of greater than 99 percent by weight of product made during the run.

Typically, the product deposited under each of the illustrated conditions is, as shown in the drawings, very fine-grained tungsten radially oriented around the seed core having average widths and thicknesses of about 1 micron and lengths of about 8–10 microns. Also, this material is of density of at least 98 percent of the theoretical for tungsten and has Knoop hardness of about 1,000 or more.

We claim as our invention:

1. Substantially spherical refractory metal particles consisting of a microstructure of columnar tungsten grains, having width and thickness of about 1/10 to about 2 microns, radially oriented from a seed of refractory metal, said microstructure of tungsten having density of at least 95% the theoretical density of tungsten, and undergoing less than about 20% recrystallization upon being subjected to about 2900° F. for about 3 hours.

2. Substantially spherical particles consisting of a microstructure of tungsten deposited on refractory metal seed, said microstructure being columnar tungsten grains radially oriented with respect to said seed, having width and thickness averaging about 1/10 to about 2 microns, density of at least 95% the theoretical density of tungsten, and undergoing less than about 20% recrystallization upon being subjected to about 2900° F. for about 3 hours, which particles, upon gas-pressure bonding at about 10,000 pounds per square inch and about 2900° F. for about three hours, yield a unitary consolidated body having density of at least 92% the theoretical density of tungsten and tensile strength of at least 50,000 pounds per square inch.

3. Substantially spherical particles consisting of a microstructure of tungsten deposited on refractory metal seed, said microstructure being columnar tungsten grains radially oriented with respect to said seed, having width and thickness averaging about 1/10 to about 2 microns, Knoop hardness number of above 900, density of at least 95% of the theoretical density of tungsten, and undergoing less than about 20% recrystallization upon being subjected to about 2900° F. for about 3 hours, which particles, upon gas-pressure bonding at about 10,000 pounds per square inch and about 2900° F. for about 3 hours, yield a unitary consolidated body of at least 92% the theoretical density of tungsten which is rollable to 80–95% reduced product having 8T ductile-brittle transition temperature below about 550° F.

4. Substantially spherical tungsten particles of 10 to 10,000 microns diameter consisting of a microstructure of deposited columnar tungsten grains, having width and thickness of about 1/10 micron to 2 microns, radially oriented with respect to a tungsten seed, said particles having density of at least 95% the theoretical density of tungsten and Knoop hardness number of least 900, and undergoing less than about 20% recrystallization upon being subjected to about 2900° F. for about 3 hours.

5. Substantially spherical particles consisting of a microstructure of tungsten deposited on refractory metal seed, said microstructure being columnar tungsten grains radially oriented with respect to said seed, having width and thickness averaging about 1/10 to about 2 microns, density of at least 95% of the theoretical density of tungsten, and undergoing less than about 20% recrystallization upon being subjected to about 2900° F. for about 3 hours, which particles, upon gas-pressure bonding at about 10,000 pounds per square inch and about 2900° F. for about 3 hours, yield a unitary consolidated body of at least 92% the theoretical density of tungsten which is rollable to 80–95% reduced product having 8T ductile-brittle transition temperature below about 550° F. and a Vickers hardness number of at least 450 after exposure to 2600° F. for one hour.

6. Substantially spherical particles consisting of a microstructure of tungsten deposited on refractory metal seed, said microstructure being columnar tungsten grains radially oriented with respect to said seed, having width and thickness averaging about 1/10 to about 2 microns, Knoop hardness number of above about 900, density of at least 95% of the theoretical density of tungsten, and undergoing less than about 20% recrystallization upon being subjected to about 2900° F. for about 3 hours, which particles, upon gas-pressure bonding at about 10,000 pounds per square inch and about 2900° F. for about 3 hours, yield a unitary consolidated body of at least 92% the theoretical density of tungsten which is rollable to 80–95% reduced product having a Vickers hardness number of atl east 450 after exposure to 2600° F. for one hour.

7. Substantially spherical refractory metal particles consisting of a microstructure of tungsten grains oriented about a seed of refractory metal, said microstructure undergoing less than about 20% recrystallization upon being subjected to about 2900° F. for about 3 hours, being of a purity, except for fluorine content hereinafter referred to, of at least 99.8% tungsten by weight, and containing fluorine in amount up to about 100 parts per million by weight.

8. The process of producing particulate tungsten by hydrogen reduction of tungsten hexafluoride comprising: simultaneously passing tungsten hexafluoride vapor and hydrogen, in an amount in excess of the stoichiometric equivalent for complete reduction of the tungsten hexafluoride vapor, upwardly through a bed of refractory metal seed particles maintained at a temperature of 400° F. to 1200° F. and a velocity sufficient to maintain said particles in a fluidized state until the diameter of the particles has at least doubled.

9. The process of claim 8 employing refractory metal seed particles selected from the group consisting of tungsten, molybdenum, tantalum, and niobium metals.

10. The process of claim 8 employing refractory metal seed particles of an initial size within the range of −20 to +325 (U.S. Sieve Series), hydrogen in an amount of from above 1 to 50 times the stoichiometric equivalent for complete reduction of the tungsten hexafluoride vapor, and maintaining the temperature within about 400° F. to 1200° F.

11. The process of claim 8 employing refractory metal seed particles of tungsten.

References Cited by the Examiner

UNITED STATES PATENTS

| 2,758,021 | 8/1956 | Drapeau et al. | 75—.5 |
| 2,885,310 | 5/1959 | Olson et al. | 117—227 |
| 2,893,839 | 7/1959 | Schytil | 75—26 |
| 2,930,767 | 3/1960 | Novak | 117—100 |
| 3,012,876 | 12/1961 | Eaton et al. | 75—84.5 |
| 3,020,148 | 2/1962 | Jenkins et al. | 75—84.5 |
| 3,043,679 | 7/1962 | Campbell et al. | 75—26 |
| 3,072,983 | 1/1963 | Brenner et al. | 75—.5 |

FOREIGN PATENTS 521,113   3/1955   Italy.

OTHER REFERENCES

Materials in Design Eng., Jan. 1960, pp. 98–100, in particular page 99.

DAVID L. RECK, *Primary Examiner.*

UNITED STATES PATENT OFFICE
CERTIFICATE OF CORRECTION

Patent No. 3,234,007                         February 8, 19(

John M. Blocher, Jr., et al.

It is hereby certified that error appears in the above numbered patent requiring correction and that the said Letters Patent should read as corrected below.

Column 10, line 19, for "lever" read -- level --; line 43, for "subsetances" read -- substances --; column 11, line 13, for "fed" read -- feed --; column 13, line 32, for "of least" read -- of at least --; column 14, line 7, for "atl east" read -- at least --.

Signed and sealed this 28th day of June 1966.

(SEAL)
Attest:

ERNEST W. SWIDER                         EDWARD J. BRENNE
Attesting Officer                          Commissioner of Patent